United States Patent
Shaulov

(10) Patent No.: US 10,996,020 B2
(45) Date of Patent: May 4, 2021

(54) SPEARGUN

(71) Applicant: Vitaliy Shaulov, Laguna Hills, CA (US)

(72) Inventor: Vitaliy Shaulov, Laguna Hills, CA (US)

( * ) Notice: Subject to any disclaimer, the term of this patent is extended or adjusted under 35 U.S.C. 154(b) by 0 days.

(21) Appl. No.: 16/871,838

(22) Filed: May 11, 2020

(65) Prior Publication Data

US 2020/0278169 A1    Sep. 3, 2020

Related U.S. Application Data

(63) Continuation of application No. 16/380,094, filed on Apr. 10, 2019, now Pat. No. 10,648,766.

(60) Provisional application No. 62/660,457, filed on Apr. 20, 2018.

(51) Int. Cl.
*F41B 7/04* (2006.01)
*A01K 81/04* (2006.01)
*F42B 6/02* (2006.01)

(52) U.S. Cl.
CPC ............... *F41B 7/04* (2013.01); *A01K 81/04* (2013.01); *F42B 6/02* (2013.01)

(58) Field of Classification Search
CPC .......................................................... F41B 7/04
See application file for complete search history.

(56) References Cited

U.S. PATENT DOCUMENTS

| | | | | |
|---|---|---|---|---|
| 1,261,992 A | * | 4/1918 | Algie | F41B 3/005 124/21 |
| 1,866,926 A | * | 7/1932 | Colby | F41B 5/12 124/22 |
| 4,411,248 A | * | 10/1983 | Kivenson | F41B 3/02 124/20.1 |
| 4,711,228 A | * | 12/1987 | Gillespie | F41B 5/123 124/24.1 |
| 5,243,955 A | * | 9/1993 | Farless | F41B 3/005 124/20.1 |
| 6,273,078 B1 | * | 8/2001 | Schwesinger | F41B 5/12 124/16 |
| 7,926,474 B2 | * | 4/2011 | Berry | F41B 7/04 124/20.3 |
| 8,567,376 B2 | * | 10/2013 | Flint | F41B 5/12 124/20.3 |
| 8,863,732 B1 | * | 10/2014 | Prior | F41B 5/123 124/25 |
| 9,052,154 B1 | * | 6/2015 | Prior | F41B 5/126 |

* cited by examiner

*Primary Examiner* — John A Ricci
(74) *Attorney, Agent, or Firm* — Crockett & Crockett, PC; K. David Crockett, Esq.; Susan L. Crockett, Esq.

(57) ABSTRACT

A sportfishing speargun is sized for ease of use and provides the power of the largest rubber band speargun. The speargun includes a drive system with a first side drive component and a second side drive component, the drive system is driven by one or more power bands to provide mechanical advantage and the force of a large speargun in a compact device.

9 Claims, 6 Drawing Sheets

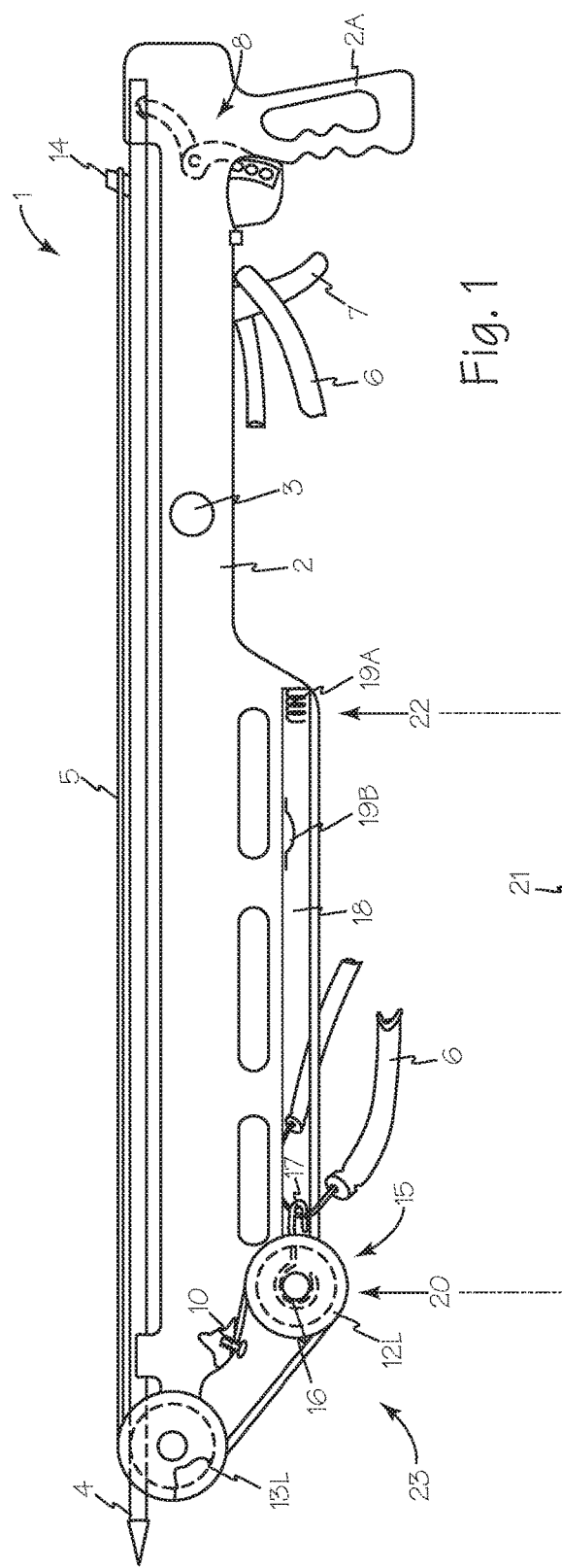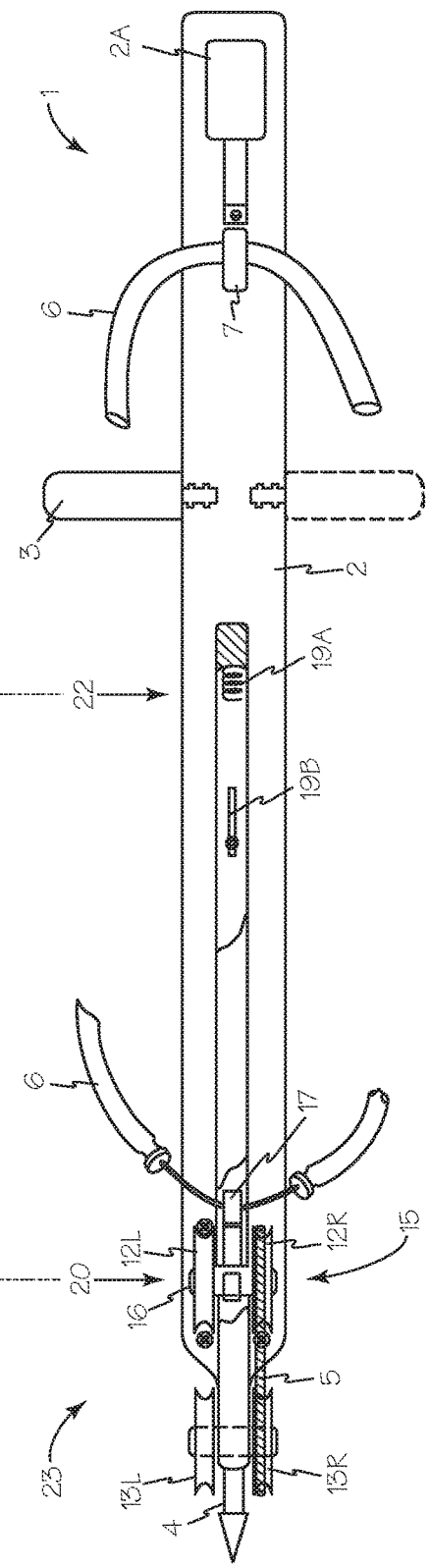

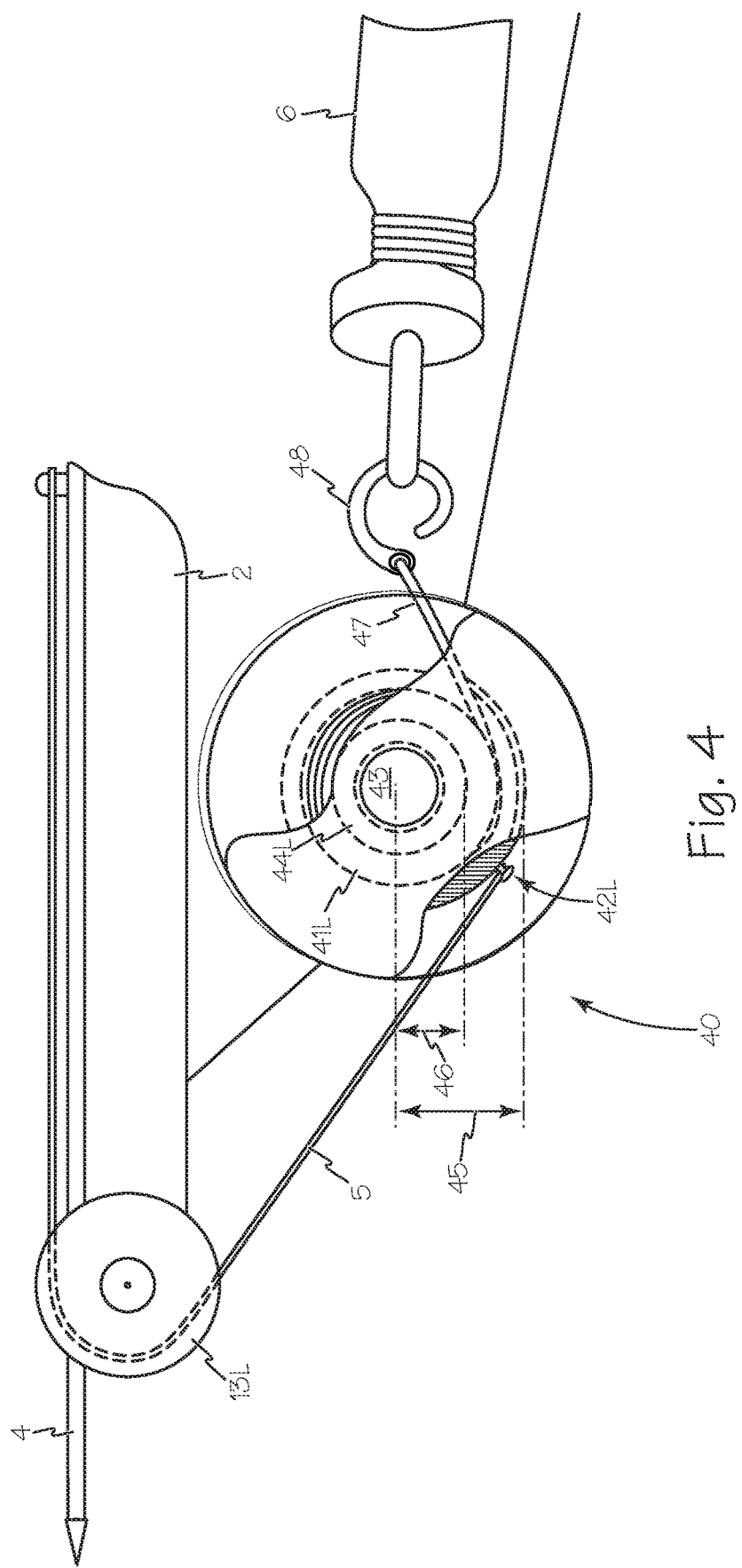

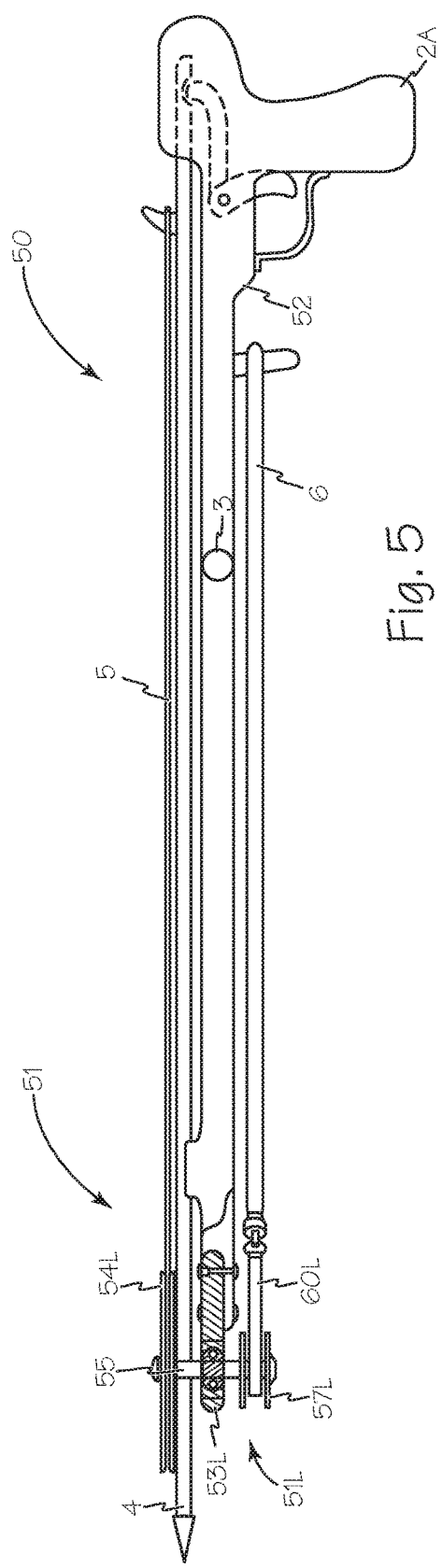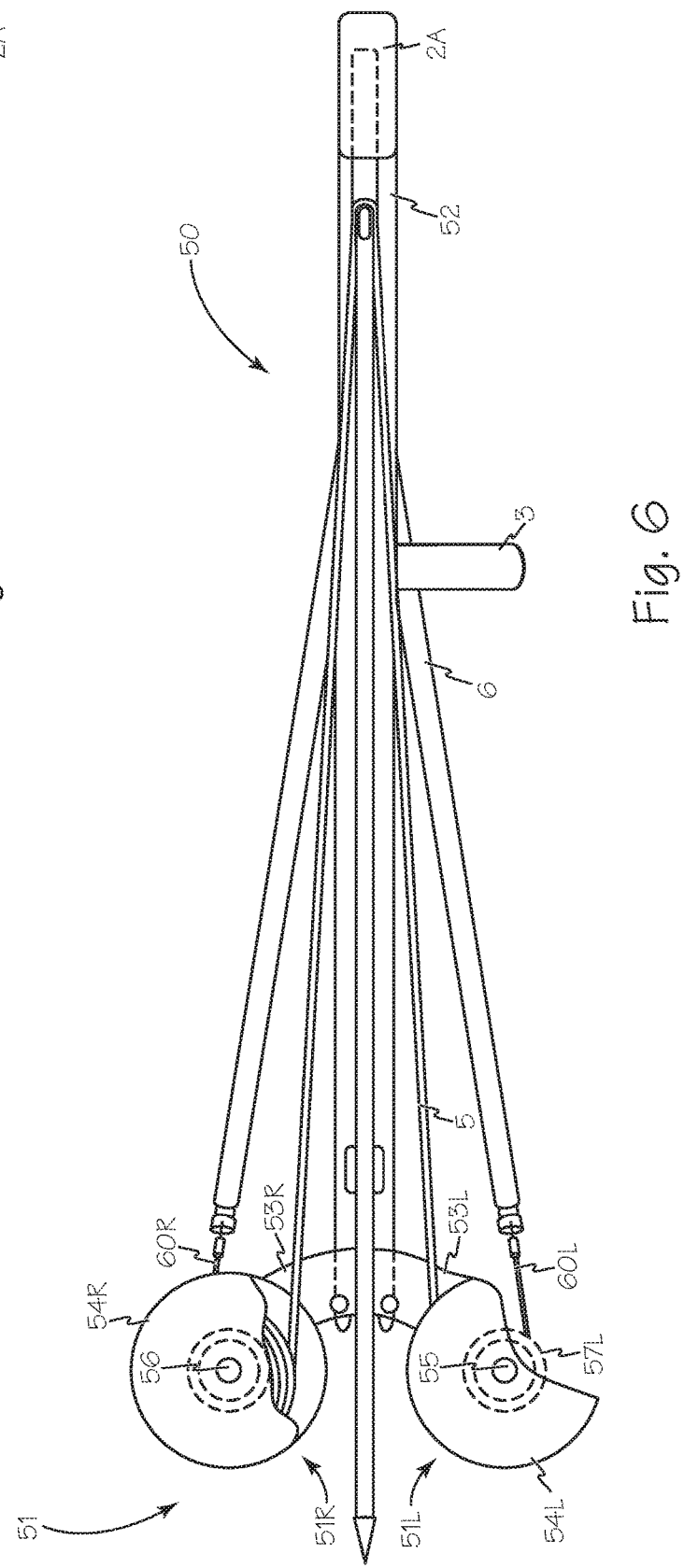

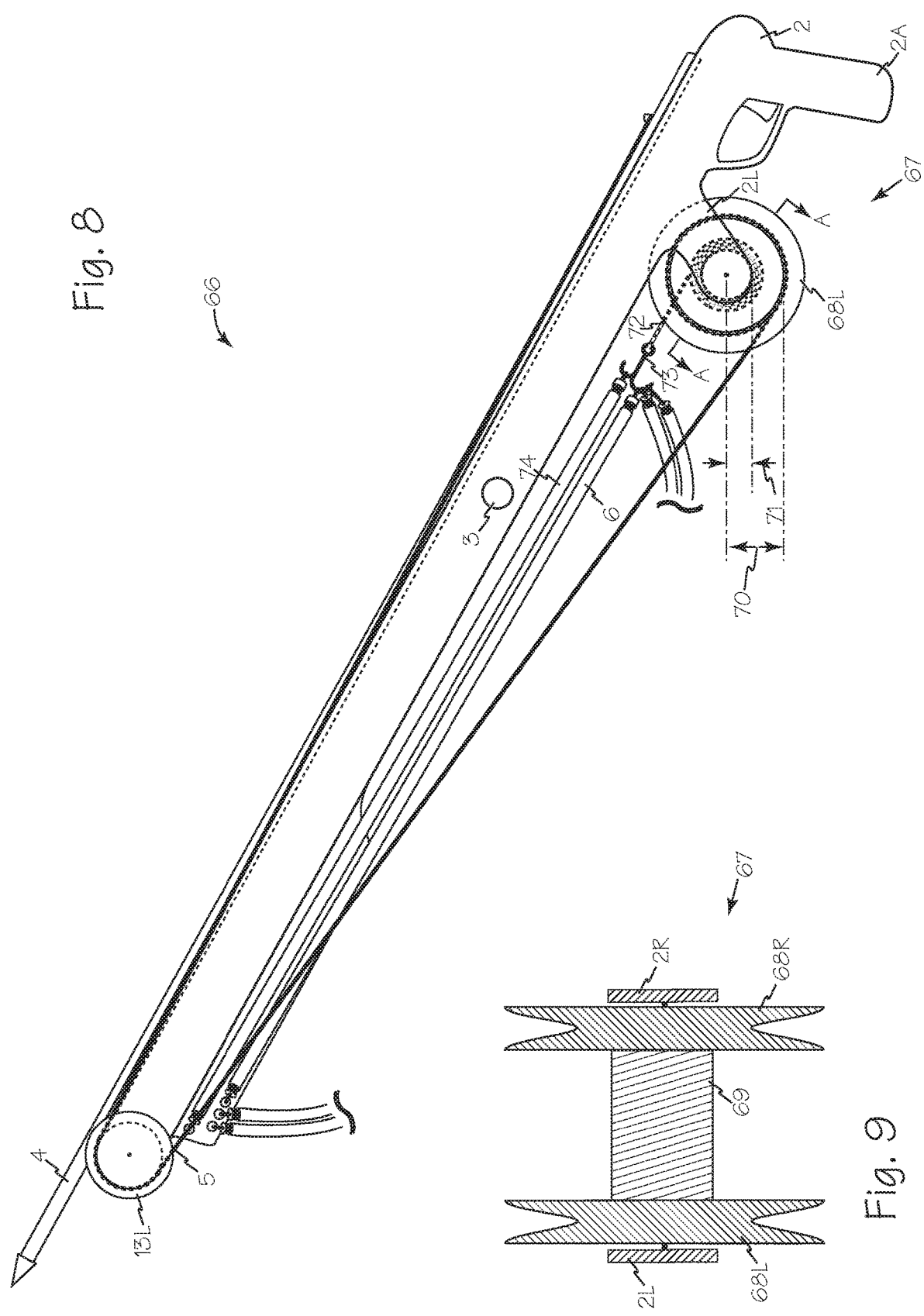
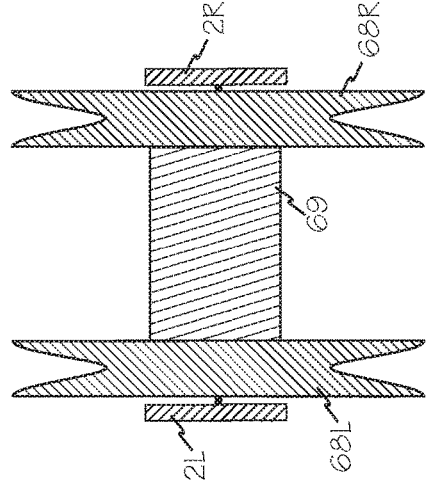

SPEARGUN

This application is a continuation of U.S. application Ser. No. 16/380,094, filed Apr. 10, 2019, which claims priority to U.S. Provisional Application 62/660,457 filed Apr. 20, 2018.

FIELD OF THE INVENTIONS

The inventions described below relate to the field of rubber band powered spearguns for sportfishing.

BACKGROUND OF THE INVENTIONS

Conventional rubber band powered spearguns are either large and unwieldy or small and underpowered.

SUMMARY

The devices and methods described below provide for a sportfishing speargun that is easy to load, maneuver and aim and provides the power of the largest rubber band speargun with a clear line of sight to aim by moving the drive mechanism below the spear. The speargun includes a drive system with one or more pulleys driven by one or more rubber bands to provide mechanical advantage and the force of a large speargun in a compact device. The speargun design moves the drive system beneath the spear and out of the target view. This configuration enables the use of any number of power bands because all of them are situated underneath the stock where they do not obscure the shooters view of the target over the top of the speargun.

BRIEF DESCRIPTION OF THE DRAWINGS

FIG. 1 is a side view of a speargun.
FIG. 2 is a bottom view of the speargun of FIG. 1 with the lower carriage rail removed for clarity.
FIG. 4 is a side view of another alternate drive mechanism for a speargun.
FIG. 5 is a side view of a variation of the alternate drive mechanism of FIG. 4.
FIG. 6 is a top view of the speargun of FIG. 5.
FIG. 8 is a side view of a speargun with an alternate drive system.
FIG. 9 is an enlarged cross-section of the drive wheel of the speargun of FIG. 8 taken along A-A.

DETAILED DESCRIPTION OF THE INVENTIONS

Figure 3:
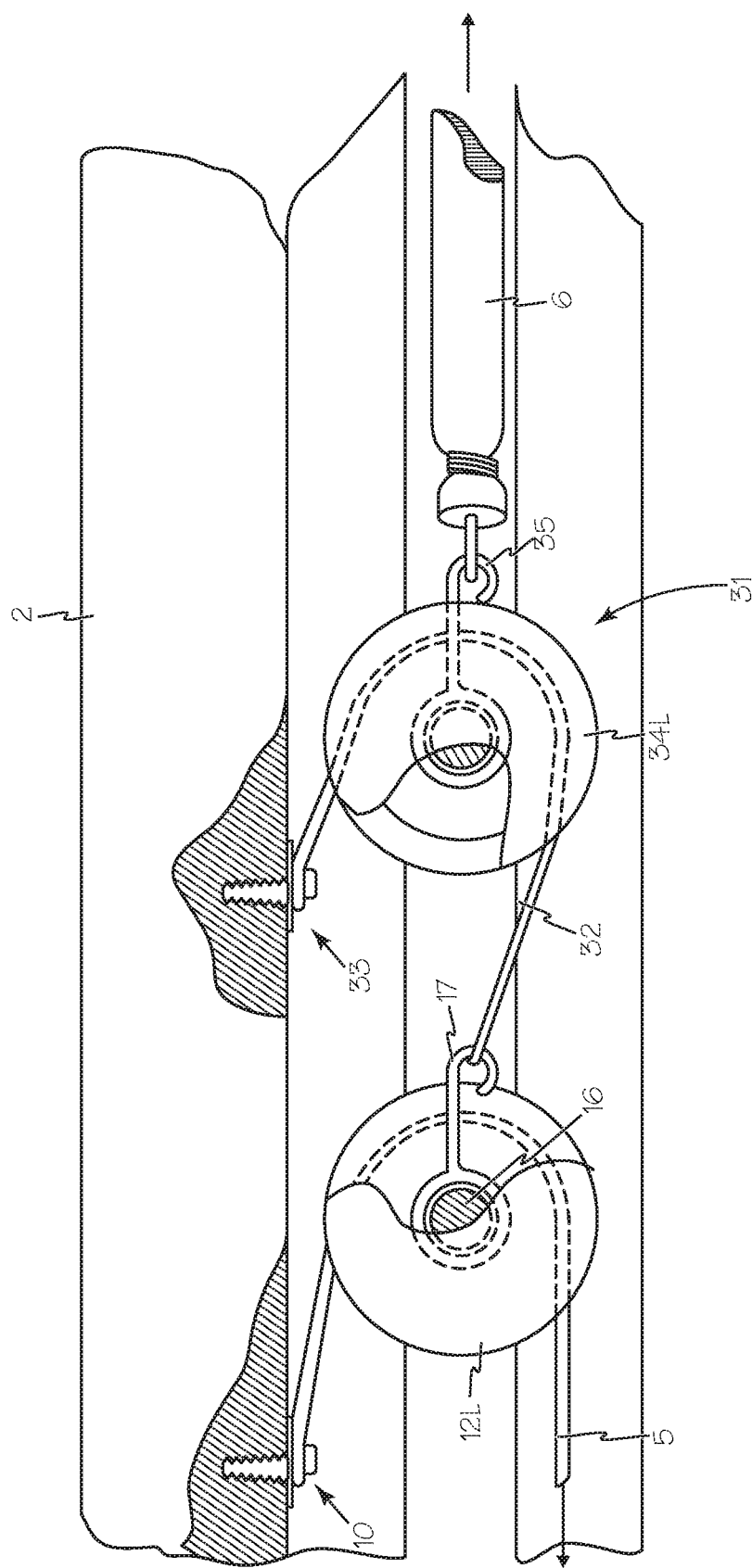
FIG. 3 is a side view of a cascade drive mechanism for a speargun.

FIG. 1 is a side view of speargun 1 which includes stock 2 having a primary grip 2A, optional side handle 3 and drive system 23. The stock supports and guides spear 4 which is propelled by cable 5. The cable is tensioned by one or more rubber bands such as rubber band 6 and the rubber bands are anchored to peg or finger 7 extending from stock 2. The stock also includes trigger assembly 8 which engages and controls the release of spear 4 using any suitable configuration. The optional side handle 3 may be attached to either side of the stock to accommodate either left or right hand use as illustrated in FIG. 2. The optional side handle 3 may also be attached at any suitable location between the primary grip 2A and the fixed pulleys 13L and 13R.

Drive system 23 includes cable 5 secured to the stock at anchor point 10 and fixed pulleys and carriage 15 powered by rubber band 6. The cable extends from anchor point 10 around carriage pulleys 12L and 12R and then around fixed pulleys 13L and 13R and it extends along the stock to engage spear 4 using any suitable configuration such as a slot or pin such as pin 14.

Carriage 15 includes axle 16 secured between carriage pulleys 12L and 12R. One or more rubber bands such as rubber band 6 are operably connected to carriage 15 using hook 17 or any other suitable configuration. Stock 2 includes carriage slot 18 to control the travel of carriage 15 as the rubber bands contract to pull the cable and launch the spear from the speargun. Carriage slot 18 includes stop spring 19A to stop and cushion the movement of the carriage at the end of its travel and rebound spring 19B to prevent the carriage from unintentionally moving back along the carriage slot after compressing stop spring 19A.

To load, a user inserts and secures spear 4 into speargun 1 with trigger assembly 8 engaged to hold the spear in the speargun. Carriage 15 is moved into loaded position 20 which permits cable 5 to extend around the carriage pulleys and the fixed pulleys to engage spear 4. One or more rubber bands are secured to hook 17 and then stretched to engage finger 7 to provide motive force for launching the spear. To fire the speargun, a user squeezes trigger 8T to cause the trigger assembly to release spear 4. With the spear free to move, the tension applied by the one or more rubber bands to carriage 15 through hook 17 causes the carriage to move along longitudinal axis 21 from loaded position 20 to finish position 22. As carriage 15 moves toward the finish position, cable 5 is pulled through the fixed pulleys to propel the spear from the speargun. The compound arrangement of fixed pulleys 13L and 13R and the carriage pulleys 12L and 12R magnifies the propulsive power of the rubber bands used to propel the spear.

FIG. 3 is a side view of a cascade drive system 30 for a speargun. The cable 5 extends from anchor point 10 around carriage pulleys 12L and 12R and then around fixed pulleys 13L and 13R and it extends along the stock to engage spear 4 as discussed above. A second stage carriage 31 is operably secured between primary carriage 15 and any suitable motive power such as one or more rubber bands 6. Drive cable 32 is secured to the stock at anchor point 33 and then drawn around secondary drive wheels 34R and 34L and further secured to hook 17. Second stage carriage 31 is operably connected to secondary hook 35 as in carriage 15. Secondary hook 35 connects any suitable motive power such as rubber band 6 to the second stage carriage.

FIG. 4 is a side view of ratio drive system 40 for a speargun. Primary or spear cable 5 engages spear 4 as discussed above and the cable passes around fixed pulleys 13L and 13R and it is secured to outer take-up reels 41L and 41R at attachment points 42L and 42R respectively. Ratio drive system 40 is formed by axle 43 secured to outer take up reels 41L and 41R and inner drive wheels 44L and 44R. The energy supplied by rubber band 6 is multiplied by the ratio between the radius of the outer take up wheel, radius 45 and the radius of the inner drive wheel 46. One or more rubber bands such as rubber band 6 are operably connected to drive cable 47 using any suitable techniques such as hook 48. Drive cable 47 is connected to the inner drive wheel and is wound around the inner drive wheel when the speargun is loaded.

Drive cable 47 is preferably a thin and flat element to prevent the growth of the drive radius as cable 47 is wound around the inner drive wheels 44R. Conversely, drive cable 5 is preferably a thick cable with a round cross section and outer take up reels 41L and 41R have narrow slots for engaging the drive cable 5 to force the drive cable to wind over itself when loading the speargun to increase the radial difference between the inner drive wheel radius 46 and the outer take up wheel radius 45 and thus, to increase the initial torque of the drive system when the trigger is released.

In use, a user operates the trigger of the speargun releasing the spear. The motive tension provided by the rubber bands applies a force 49 to the drive cable causing the inner drive wheel to turn. The turning of the inner drive wheel causes the take up wheel to turn which pulls on cable 5 which is wound on the take up wheel. The force applied to cable 5 causes the spear to be launched from the speargun.

Figure 7:
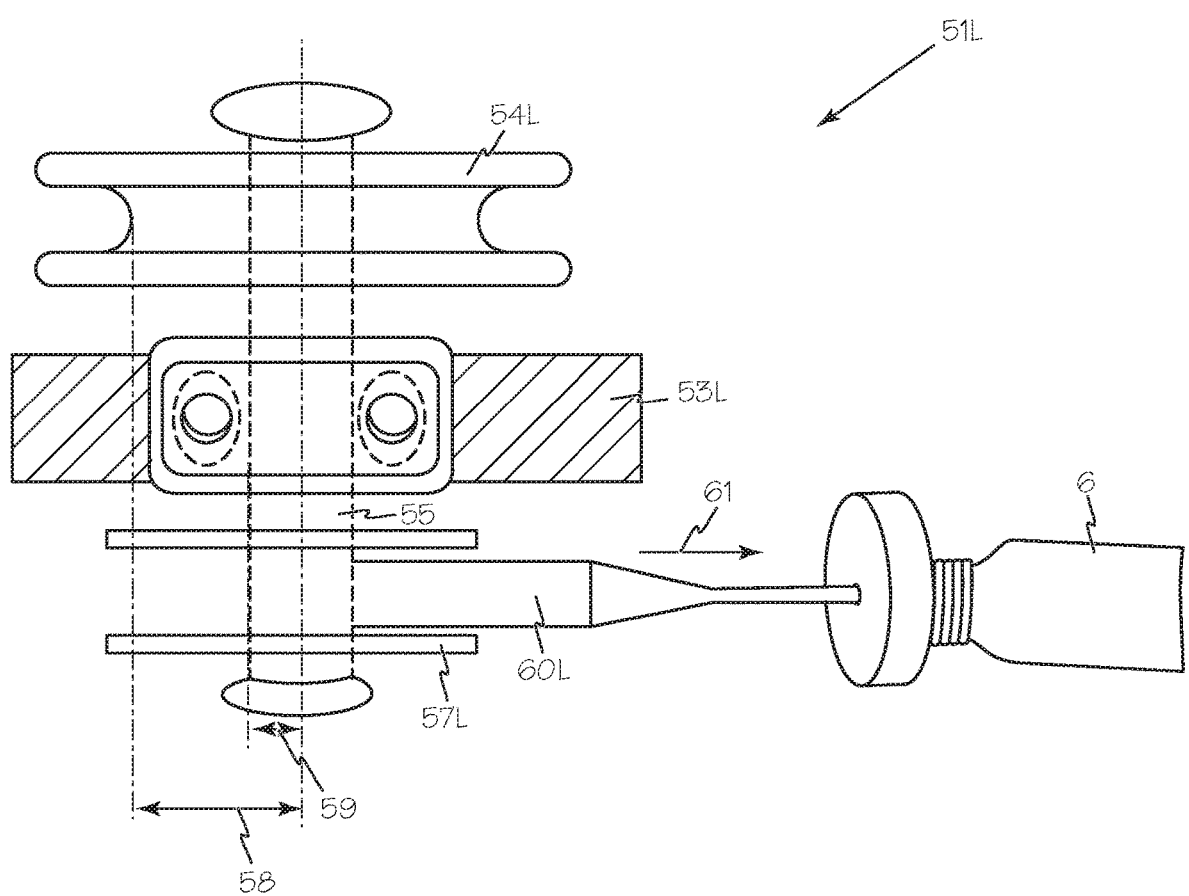
FIG. 7 is a close up view of the drive wheels of the speargun of FIG. 5.

FIGS. 5, 6 and 7 illustrate a first variation of the ratio drive system 40 of FIG. 4. Speargun 50 includes ratio drive system 51 secured to stock 52. Ratio drive system 51 separates left and right drive components 51R and 51L and secures them on horizontal wings 53R and 53L respectively. Primary or spear cable 5 engages spear 4 as discussed above and the cable is secured to upper take-up reels 54L and 54R. Ratio drive system 40 is formed by right axle 55 and left axle 56 secured to upper take up reels 54R and 54L and lower drive wheels 57R and 57L respectively. The energy supplied by rubber band 6 is multiplied by the ratio between the radius of the upper take up wheel, radius 58 and the radius of the lower drive wheel, radius 59. One or more rubber bands such as rubber band 6 are operably connected to drive straps such as straps 60R and 60L using any suitable technique. The drive straps are connected to the lower drive wheel and are wound around the lower drive wheel when the speargun is loaded. The optional side handle 3 may also be attached at any suitable location on the stock between the primary grip 2A and the fixed pulleys 13L and 13R.

In use, a user operates the trigger of the speargun releasing the spear. The motive tension provided by the rubber bands applies a force 61 to the drive straps causing the lower drive wheel to turn. The turning of the lower drive wheel causes the upper take up wheel to turn which pulls on cable 5 which is wound on the upper take up wheel. The force applied to cable 5 causes the spear to be launched from the speargun.

FIGS. 8 and 9 illustrate a second variation of the ratio drive system 40 of FIG. 4. Speargun 66 includes ratio drive system 67. Primary or spear cable 5 engages spear 4 as discussed above and the cable passes around fixed pulleys 13L and 13R and it is secured to outer take-up reels 68L and 68R respectively. Ratio drive system 67 is formed by drive spool 69 secured to outer take up reels 68L and 68R which are supported from the stock by fingers 2L and 2R. The energy supplied by rubber band 6 through drive cable 72 to the drive spool 69 is multiplied by the ratio between the radius of the outer take up reel, radius 70 and the radius of the drive spool, radius 71. One or more rubber bands such as rubber band 6 are operably connected to drive cable 72 using any suitable techniques such as hook 73. Drive cable 72 is connected to the drive spool and is wound around the drive spool when the speargun is loaded. Pretension band 74 maintains suitable tension in the drive system. As discussed above the optional side handle 3 may also be attached at any suitable location between the primary grip 2A and the fixed pulleys 13L and 13R.

Drive cable 72 is preferably a thin and flat element to prevent the growth of the drive radius as cable 72 is wound around the spool 69. Conversely, drive cable 5 is preferably a thick cable with a round cross section and outer take up reels 68L and 68R have narrow slots for engaging the drive cable 5 to force the drive cable to wind on top of itself when loading the speargun to increase the radial difference between the inner drive wheel radius 71 and the outer take up wheel radius 70 and thus, to increase the initial torque of the drive system when the trigger is released.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. A speargun (50) comprising:
a stock (52) having a primary grip (2A);
a first side axle (55) disposed on a first side of the stock and operably connected to a first upper take-up reel (54L) and a first lower drive wheel (57L);
a first drive strap (60L) operably connected between the first lower drive wheel (57L) and a first end of a power band (6);
a second side axle (56) disposed on a second side of the stock and operably connected to a second upper take-up reel (54R) and a second lower drive wheel (57R);
a second drive strap (60R) operably connected between the second lower drive wheel (57R) and a second end of the power band (6);
a primary cable (5) operably connected between the first and second upper take-up reels (54L/54R) and configured for engagement with a spear (4).

2. The speargun of claim 1 wherein the first side axle (55) is fixed to the stock via a first wing (53L) extending laterally from the first side of the stock and the second side axle (56) is fixed to the stock via a second wing (53R) extending laterally from the second side of the stock.

3. The speargun of claim 1 further comprising a side handle operatively engaging the stock.

4. A speargun (50) comprising:
a stock (52) having a primary grip;
a power band (6) characterized by a first end and a second end;
a drive system (51) having a first drive component (51L) secured to a first side of the stock and a second drive component (51R) secured to a second side of the stock;
said first drive component comprising a first side axle (55), said first side axle fixed to a first take-up reel (54L) and a first lower drive wheel (57L);
said second drive component comprising a second side axle (56), said second side axle fixed to a second take-up reel (54R) and a second lower drive wheel (57R);
said first drive component operably connected to a first drive strap (60L), said first drive strap operably connected to the power band first end;
said second drive component operably connected to a second drive strap (60R), said second drive strap operably connected to the power band second end;
a primary cable (5) operably connected between the first upper take-up reel (54L), the second upper take-up reel (54R) and a spear (4).

5. The speargun of claim 4 wherein the first drive component (51L) is fixed to the stock via a first wing (53L) extending laterally from the first side of the stock and the second drive component (51R) is fixed to the stock via a second wing (53R) extending laterally from the second side of the stock.

6. The speargun of claim 4 further comprising a side handle operatively engaging the stock.

7. The speargun of claim 4 wherein
the first lower drive wheel (57L) is rotationally fixed to the first take-up reel (54L), wherein the first lower drive wheel (57L) is characterized by a diameter (59), wherein the first take-up reel is characterized by a first diameter (58), wherein the first diameter of first take-up reel is greater than the diameter of the first lower drive wheel, wherein the primary cable is fixed to the first take-up reel, said first take-up reel configured to spool the primary cable upon rotation of the first take-up reel;
said first lower drive wheel configured to spool the first drive strap around the first lower drive wheel such that unspooling of the first drive strap will cause rotation of the first lower drive wheel, the first side axle and the first take-up reel, thereby causing movement of the primary cable exceeding the movement of the first drive strap.

8. A speargun comprising:
a stock (52) having a primary grip (2A);
a first drive strap (60L) operably connected between a first lower drive wheel (57L) and a power band (6);
a second drive strap (60R) operably connected between a second lower drive wheel (57R) and the power band (6);
a primary cable (5) operably connected between a first upper take-up reel (54L), a second upper take-up reel (54R) and a spear (4), the drive straps (60R/L) operable to eject the spear (4) from the stock (52).

9. The speargun of claim 8 further comprising a side handle operatively engaging the stock.

\* \* \* \* \*